UNITED STATES PATENT OFFICE.

JOHN B. LAFITTE, OF NEW ORLEANS, LOUISIANA.

IMPROVEMENT IN METHODS OF PREPARING HAY FOR ANIMAL-FOOD.

Specification forming part of Letters Patent No. 194,691, dated August 28, 1877; application filed July 6, 1877.

*To all whom it may concern:*

Be it known that I, JOHN B. LAFITTE, of the city of New Orleans, parish of Orleans, and State of Louisiana, have discovered a new and Improved Mode or Manner of Preparing Hay as Food for Animals; and I do hereby declare that the following is an exact description of the same.

I have discovered that hay, when compressed under a pressure of about four hundred thousand pounds per square foot, has a specific gravity equal to that of corn or wheat, and that it weighs from forty-five to sixty pounds per cubic foot; that under such compression its air-cells are all crushed, its air expelled, and its elasticity all destroyed, so that it remains an inert mass, like a kernel of corn or wheat; and that in this state it requires but little more mastication than meal; and, further, that horses and other animals fed on hay thus prepared require much less hay and corn than when fed on hay prepared in the usual manner, or with hay which has been cut up or "chopped," but with its tubular structure undestroyed.

I am aware that hay has heretofore been compressed in order to reduce its bulk, to facilitate its transportation, as well as to economize space in storing it away for future use; but such treatment does not destroy its elasticity; neither does it destroy its air-cells, nor its tubular structure.

Under my treatment the hay is reduced to what may be termed "solid food," while at the same time the toughness peculiar to hay as commonly fed is destroyed, thus rendering its mastication and digestion easy, as well as avoiding the great waste incident to feeding animals with the ordinary hay In order practically to carry out my treatment of hay, it is only necessary to place it in a properly-formed press, and apply to it either hydraulic, hydrostatic, or other pressure sufficient to break down its fibers, crush its air-cells, and destroy its tubular structure, thus reducing it to a compact, inert, and inelastic mass.

I claim—

Hay which, by compression, has been reduced to solid food by the destruction of its air-cells and its tubular structure, substantially as and for the purpose described.

JOHN B. LAFITTE.

Witnesses:
 JAS. A. LAFITTE,
 W. A. S. WHEELER.